W. C. GAMBREL.
SPACER FOR FENCE LINE WIRES.
APPLICATION FILED OCT. 29, 1910.
985,993.
Patented Mar. 7, 1911.
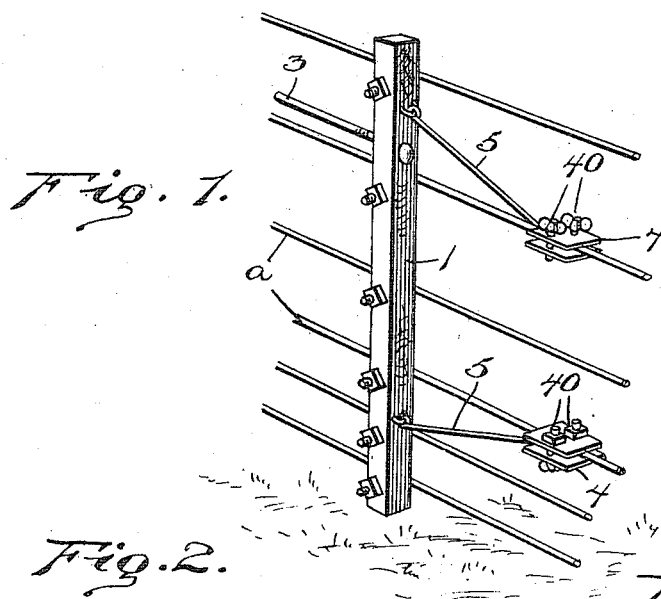
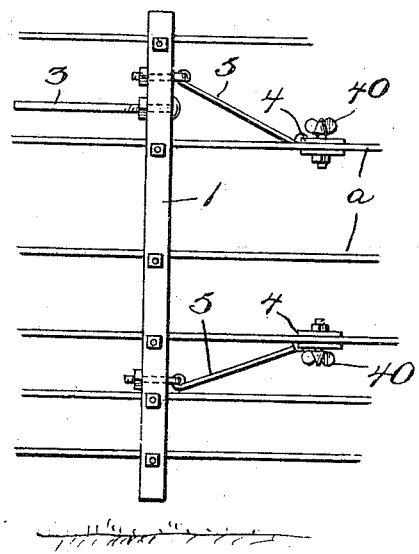
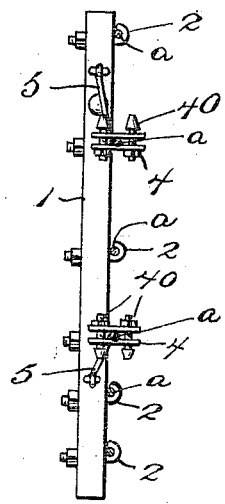
Witnesses
L. L. Burket
C. P. Wright Jr.
Inventor
W. C. Gambrel.
By Ira C. Graham
Attorney

UNITED STATES PATENT OFFICE.

WALTER CALVIN GAMBREL, OF TABOR, ILLINOIS.

SPACER FOR FENCE LINE-WIRES.

985,993. Specification of Letters Patent. Patented Mar. 7, 1911.

Application filed October 29, 1910. Serial No. 589,797.

*To all whom it may concern:*

Be it known that I, WALTER CALVIN GAMBREL, a citizen of the United States, residing at Tabor, in the county of Dewitt and State of Illinois, have invented certain new and useful Improvements in Spacers for Fence Line-Wires, of which the following is a specification.

This invention relates to certain improvements in fence line wire spacers; and the objects and nature of the invention will be readily understood by those skilled in the art in the light of the following explanation of the accompanying drawings showing what I now consider my preferred embodiment from among other constructions within the spirit and scope of my invention.

The invention consists in certain novel features in construction and in combinations and arrangements as more fully and particularly pointed out hereinafter.

Referring to the accompanying drawings; Figure 1 is a perspective view of a spacer of my invention applied to a fence. Fig. 2 is a side elevation thereof. Fig. 3 is an edge elevation, the fence line wires being shown in cross section.

In the construction of line wire fences, particularly long fences, where considerable distances intervene between the line posts, it is necessary to secure the line wires together by vertical stays between line posts, and it is desirable to maintain the proper spacing of the line wires between the line posts and while the stays are being secured so that the wires will be properly spaced at the stays and will be maintained so spaced by the stays. It is exceedingly difficult to attain the proper spacing of the line wires at distances from the posts and to then so secure the stays as to maintain such spacing.

It is the object of my invention to provide a portable device whereby the line wires can be properly spaced and will be so held while a vertical stay is being applied to the series of line wires to maintain such spacing, whereupon the device can be removed from the wires and carried to the next point where a stay is to be applied.

In the drawings, 1 is the body of the portable spacer consisting of a straight bar of such length that when vertically arranged against the fence it will traverse all of the line wires *a* thereof. This bar carries a vertical series of laterally-projecting horizontal open line-wire-receiving hooks 2, one for each line wire of the fence, and these hooks are spaced apart according to the proper or desired spacing of the line wires. The hooks are so formed that when the bar is held in a vertical position against the fence the line wires can be readily placed in the hooks so that the bar will be carried by the wires and yet so that the hooks will positively hold the wires the desired distances apart and against independent vertical movement. The bar is provided with a leveling or sighting projection whereby the operator can readily determine whether the bar is in the desired accurate perpendicular or vertical position. For instance, I show a straight stiff rod 3, rigid with and projecting horizontally from, that is at right angles to, the bar so that when the bar is in the perpendicular position this rod will be in the horizontal position and parallel with the adjacent line wire and by closely observing this rod and its relation to the adjacent line wire, the operator can readily see whether the bar is in the desired position.

For the purpose of maintaining the bar in the desired vertical position and whereby the bar can be adjusted to the desired position, I provide line wire clamps 4, having link connections 5, to the opposite end portions of the bar or body 1, respectively. Each clamp consists of a base plate and an adjustable plate and a pair of removable clamping screws 40, whereby said plates can be drawn tightly against a line wire arranged therebetween. The clamps are arranged on different line wires and are located in advance of the bar 1, and the clamps can be slipped along the line wires until the bar is located in the desired position whereupon both clamps are tightened on their respective wires. Either clamp can be loosened and moved toward or from the bar 1, to shift said bar in adjusting the same accurately to the perpendicular position. When the bar has been thus accurately set, and all of the line wires are held thereby properly spaced, the stay is arranged adjacent to said bar and is fixed to all the line wires. When the stay has been secured, the clamps 4 are loosened and the spacer is moved to the point on the line wires where the next stay is to be secured.

It is evident that various changes might be resorted to in the forms, constructions and arrangements of the parts described without departing from the spirit and scope of my invention.

What I claim is:—

1. A spacer for fence line wires consisting of an elongated bar having a longitudinal series of spaced line wire spacing elements, clamps adjustable longitudinally on and adapted to grip different line wires, and bar connections from said clamps, respectively, to said bar, substantially as described.

2. A spacer for fence line wires consisting of a bar provided with line wire spacing means, a pair of separate line wire gripping clamps, loose link connections therefrom to the opposite end portions of said bar, and a sighting or leveling rod arranged at right angles to said bar and projecting therefrom, substantially as described.

In testimony whereof I affix my signature in presence of two witnesses.

WALTER CALVIN GAMBREL.

Witnesses:
E. S. McDONALD,
ROSA VOELCKER.

Copies of this patent may be obtained for five cents each, by addressing the "Commissioner of Patents, Washington, D. C."